(12) United States Patent
Kubo et al.

(10) Patent No.: US 8,097,048 B2
(45) Date of Patent: Jan. 17, 2012

(54) POLYPHENYLENE SULFIDE MEMBER AND METHOD FOR PRODUCING THE SAME

(75) Inventors: Kenzo Kubo, Ritto (JP); Makoto Nakahara, Otsu (JP); Taizo Horiike, Otsu (JP); Hideyuki Yamamoto, Kusatsu (JP); Ryutaro Ito, Ibaraki (JP); Koji Sumi, Shiga (JP)

(73) Assignee: TORAY Industries, Inc., Tokyo (JP)

( * ) Notice: Subject to any disclaimer, the term of this patent is extended or adjusted under 35 U.S.C. 154(b) by 0 days.

(21) Appl. No.: 10/468,255

(22) PCT Filed: Feb. 21, 2002

(86) PCT No.: PCT/JP02/01523
§ 371 (c)(1),
(2), (4) Date: Aug. 19, 2003

(87) PCT Pub. No.: WO02/066548
PCT Pub. Date: Aug. 29, 2002

(65) Prior Publication Data
US 2004/0082694 A1    Apr. 29, 2004

(30) Foreign Application Priority Data

Feb. 21, 2001  (JP) .................................. 2001-044777
Feb. 21, 2001  (JP) .................................. 2001-044846

(51) Int. Cl.
*C09B 67/00*    (2006.01)

(52) U.S. Cl. ........ 8/573; 8/550; 8/574; 8/576; 8/115.51; 8/442; 428/375; 428/394

(58) Field of Classification Search ............... 428/364, 428/375, 394, 395; 528/388, 373, 377, 391; 524/91
See application file for complete search history.

(56) References Cited

U.S. PATENT DOCUMENTS

| | | | | |
|---|---|---|---|---|
| 4,199,321 A * | 4/1980 | Blackwell et al. | ............. | 8/587 |
| 4,323,597 A | 4/1982 | Olson | ............. | 427/160 |
| 4,383,069 A * | 5/1983 | Davies | ............. | 524/299 |
| 4,770,905 A | 9/1988 | Silbermann et al. | ............. | 427/160 |
| 4,831,068 A * | 5/1989 | Reinert et al. | ............. | 524/100 |
| 4,871,793 A * | 10/1989 | Nakahara et al. | ............. | 524/91 |
| 4,895,981 A * | 1/1990 | Reinert et al. | ............. | 8/565 |
| 4,937,026 A | 6/1990 | Goossens et al. | ............. | 264/129 |
| 4,940,469 A * | 7/1990 | Mockel et al. | ............. | 8/527 |
| 5,268,450 A * | 12/1993 | DesLauriers et al. | ............. | 528/388 |
| 5,274,015 A * | 12/1993 | Deslauriers et al. | ............. | 524/91 |
| 5,437,690 A * | 8/1995 | Caldwell et al. | ............. | 8/590 |
| 5,447,540 A * | 9/1995 | Kobayashi et al. | ............. | 8/654 |
| 5,498,345 A * | 3/1996 | Jollenbeck et al. | ............. | 252/589 |
| 5,516,436 A * | 5/1996 | Uchida et al. | ............. | 252/8.61 |
| 5,756,580 A * | 5/1998 | Natori et al. | ............. | 525/100 |
| 5,852,159 A * | 12/1998 | Zah et al. | ............. | 528/363 |
| 6,391,065 B1 * | 5/2002 | Cooke | ............. | 8/442 |
| 6,653,484 B2 * | 11/2003 | Toan et al. | ............. | 548/259 |
| 7,005,089 B2 * | 2/2006 | Takeuchi et al. | ............. | 252/608 |
| 7,175,675 B2 * | 2/2007 | Pyles et al. | ............. | 8/506 |
| 7,235,111 B2 * | 6/2007 | Leggio et al. | ............. | 8/557 |
| 2002/0094320 A1 * | 7/2002 | Toan et al. | ............. | 424/59 |
| 2002/0151655 A1 * | 10/2002 | McNamara et al. | ............. | 525/242 |
| 2003/0193045 A1 * | 10/2003 | Takeuchi et al. | ............. | 252/601 |
| 2005/0005372 A1 * | 1/2005 | Leggio et al. | ............. | 8/512 |
| 2005/0125916 A1 * | 6/2005 | Pyles et al. | ............. | 8/509 |
| 2007/0079453 A1 * | 4/2007 | Pyles et al. | ............. | 8/506 |

FOREIGN PATENT DOCUMENTS

| | | | |
|---|---|---|---|
| EP | 0 151 961 A1 | | 8/1985 |
| JP | 63-12644 A | | 1/1988 |
| JP | 01-272883 A | | 10/1989 |
| JP | 01272883 A | * | 10/1989 |
| JP | 4-50310 A | | 2/1992 |
| JP | 4-277528 A | | 10/1992 |
| JP | 04-289279 A | | 10/1992 |
| JP | 9-109223 A | | 4/1997 |
| JP | 2001-172574 A | | 6/2001 |
| JP | 2002322360 A | * | 11/2002 |
| JP | 2003020501 A | * | 1/2003 |
| JP | 2003020564 A | * | 1/2003 |
| JP | 2003278017 A | * | 10/2003 |
| JP | 2003339503 A | * | 12/2003 |
| JP | 2004011062 A | * | 1/2004 |

* cited by examiner

*Primary Examiner* — Jill Gray
(74) *Attorney, Agent, or Firm* — Kubovcik & Kubovcik

(57) ABSTRACT

Disclosed is a PPS member having an excellent fastness to lights such as ultraviolet light, and of which color does not change even when the member is used outdoors, while retaining the characteristics of PPS. The polyphenylene sulfide member according to the present invention is characterized by having a light-fastness rating of Class 1 or higher, against light from an ultraviolet carbon arc lamp, which rating is measured in accordance with JIS L-0842.

3 Claims, No Drawings

POLYPHENYLENE SULFIDE MEMBER AND METHOD FOR PRODUCING THE SAME

TECHNICAL FIELD

The present invention relates to a polyphenylene sulfide member which is excellent in resistance to lights such as ultraviolet light. More particularly, the present invention relates to a polyphenylene sulfide member which exhibits prominent light-resistance, when the member is in the form of a polyphenylene sulfide fiber used in clothing such as socks, underwear and clothes, and in bedding such as futon, blanket and pillow, which are used or dried under the sun.

BACKGROUND ART

Fibrous materials made of polyphenylene sulfide (hereinafter referred to as simply "PPS") are conventionally used in clothing and bedding which demand warmth retaining property. These materials consists of 100% PPS, or the materials are composites comprising PPS fibers and one or more other generally used fibers such as wool fibers, polyacrylonitrile fibers, cotton fibers, polyethylene terephthalate fibers, polypropylene fibers, nylon fibers and polyurethane fibers. Further, since PPS is a resin which is excellent in heat resistance and dimensional stability, it is now considered to widely use PPS as molded articles used in consumer electrical appliances (e.g., protection films in the chambers, door knobs and finger grips in microwave ovens).

However, PPS has a drawback intrinsic to this material in that its light-resistance is poor, that is, its color changes under irradiation by light such as ultraviolet light. Therefore, there is a concern that in PPS members such as fibers, fibrous materials, films and molded articles made of 100% PPS or made of PPS and other generally used resins, the PPS changes its color to brown upon being irradiated with sunlight for a ling time, so that the outer appearance of the members are degraded, and in turn, the reliability by consumers is decreased.

It is known that, in general, to improve light-resistance of a resin member, a light stabilizer is contained in the resin or the surface of the resin is coated with a light stabilizer. However, as for PPS, no successful case employing such a light stabilizer is known.

Further, PPS also has a problem in that it cannot be dyed with a dye such as a cationic dye or acid dye because polyphenylene sulfide per se has a molecular structure having no sites for binding a dye. Further, even in cases where a disperse dye is used, it is difficult to carry out the dyeing by using either a normal pressure dyeing machine or high pressure dyeing machine. This problem of polyphenylene sulfide, that is, the problem of being difficult to be dyed is lethal to commercial products for which improvements in outer appearances are important.

DISCLOSURE OF THE INVENTION

In view of the above-mentioned background of the prior art, an object of the present invention is to provide a PPS member having an excellent resistance to lights such as ultraviolet light, and of which color does not change even when the member is used outdoors, while retaining the characteristics of PPS.

To solve the above-mentioned problem, the PPS member according to the present invention is characterized by having a light-fastness rating of Class 1 or higher, against light from an ultraviolet carbon arc lamp, which rating is measured in accordance with JIS L-0842.

In a preferred mode of the present invention, the PPS member contains at least one ultraviolet absorber selected from the group consisting of the compounds represented by Formula (I) below and the compounds represented by Formula (II) below:

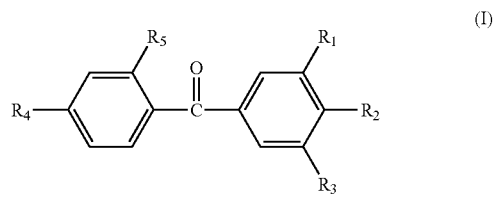

(wherein $R_1$ is hydrogen or hydroxyl; $R_2$ is hydroxyl or $C_1$-$C_{12}$ linear or branched alkyloxy; $R_3$ is hydrogen or —$SO_3H$; $R_4$ is hydrogen or —$OCH_3$; and $R_5$ is hydrogen or hydroxyl)

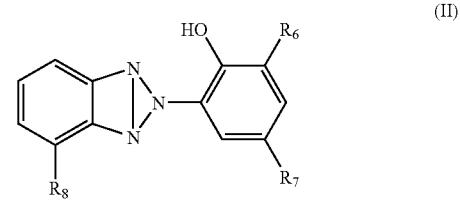

(wherein $R_6$ is hydrogen or $C_1$-$C_5$ linear or branched alkyl; $R_7$ is $C_1$-$C_5$ linear or branched alkyl; and $R_8$ is hydrogen or chlorine).

According to the present invention, a PPS member with which the degree of color change is small even when it is used outdoors due to its excellent light-fastness rating is provided.

Further, with the PPS member according to the present invention, the dyeing property of the PPS member may be increased during the production process thereof, so that PPS members having various colors may be provided.

BEST MODE FOR CARRYING OUT THE INVENTION

The PPS member according to the present invention is made of a polymer having phenylene sulfide structural units represented by —($C_6H_4$—S)— in an amount of not less than 90 mol % based on the total structural units. Preferably, not less than 90 mol % of the phenylene sulfide units are bound at para positions. Such a PPS may be produced by a known method.

One or more resins may be contained in or copolymerized with the PPS member according to the present invention, in an amount not adversely affecting the effect of the present invention and as long as its amount is less than 10% by weight based on the total weight of the PPS member. The resins are not restricted, and examples of the resins include polyethylene resins, polypropylene resins, polystyrene resins, ABS resins, polyamide resins, polycarbonate resins, polyethylene terephthalate resins, polybutylene terephthalate resins, polyacetal resins, modified polyphenylene ether resins, polysulfone resins, polyether imide resins, polyarylate resins, liquid crystal polymers, polyether sulfone resins, polyether ketone resins, polyimide resins, tetrafluropolyethylene resins, thermoplastic polyurethane resins, polyamide elastomers, polyester elastomers and fluorine-contained resins.

The PPS member according to the present invention has a light-fastness rating of Class 1 or higher, against light from an ultraviolet carbon arc lamp, which rating is measured in accordance with JIS L-0842, and is indicative of light-resistance. If the light-fastness rating is less than Class 1, the degree of color change of the PPS member when irradiated with sunlight is large, and the above-described problem cannot be overcome. The light-fastness rating is preferably Class 2 or higher, more preferably Class 3 or higher.

The light-fastness rating defined in the present invention is measured by the third exposure method of the ultraviolet carbon arc lamp method described in JIS L-0842. That is, a test piece and a blue scale defined in this JIS standard are together exposed to the light from a carbon arc lamp, and the change or fading of the test piece and that of the blue scale are compared so as to judge the light-fastness of the test piece. The class of the light-fastness rating is expressed by the class of the blue scale which exhibited the same degree of color change or fading as the test piece. The higher the class, the better the light-fastness.

The above-mentioned third exposure method of the ultraviolet carbon arc lamp method described in JIS L-0842 will now be described in detail.
1. In cases where the sample to be tested is a cloth, a test piece sizing not less than 1 cm×6 cm is sampled.
2. In cases where the sample is a thread, the thread is wound about a cardboard sizing not less than 1 cm×6 cm in the direction parallel to the longer side of the cardboard such that the thickness of the wound thread is uniform.
3. In cases where the sample is a staple, the staple is made into a sliver and the sliver is wound about a cardboard sizing not less than 1 cm×6 cm in the direction parallel to the longer side of the cardboard.
4. In cases where a sample is a resin plate, a test piece sizing not less than 1 cm×6 cm is sampled.
5. A blue scale defined in JIS L-0841, "Method for testing fastness of dyeing to sunlight", is provided.
6. Half part of the test piece and half part of the blue scale are covered with opaque white cardboards, respectively, and the test piece and the blue scale are mounted on a sample holder for an ultraviolet carbon arc lamp type light-resistance testing apparatus defined in JIS L-0842.
7. The sample holder on which the test piece and the blue scale are mounted is set in the testing apparatus.
8. Exposure to light is started and continued until the color of the class of interest in the blue scale is faded to the standard level.
9. When the color of the class of interest in the blue scale is faded, exposure is stopped, and the test piece and the blue scale are taken out, followed by leaving the test piece and the blue scale to stand in a dark place at room temperature for not less than 2 hours.
10. The color change between the irradiated part and non-irradiated part of the test piece, and color change between the irradiated part and non-irradiated part of the blue scale are compared, and the degree of change or fading of color is rated according to the following rating criteria.

TABLE 1

| Judging Criteria | Class |
| --- | --- |
| The degree of change or fading of the color of the test piece is the same as that of the blue scale | The class of the blue scale |
| The degree of change or fading of the color of the test piece is the same as that of the blue scale or smaller than that | The class of the blue scale or higher |
| The degree of change or fading of the color of the test piece is larger than that of the blue scale | Less than the class of the blue scale |

The method for obtaining the PPS member according to the present invention will now be explained referring to an example thereof. It should be noted, however, the present invention is not restricted by this explanation.

The PPS member according to the present invention may be obtained by at least incorporating (preferably by internal diffusion) a specific ultraviolet absorber represented by the following Formula (I) or Formula (II) in PPS.

That is, the ultraviolet absorber is at least one compound selected from the group consisting of the compounds represented by Formula (I) below and the compounds represented by Formula (II) below:

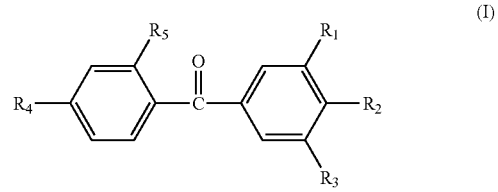

(I)

(wherein $R_1$ is hydrogen or hydroxyl; $R_2$ is hydroxyl or $C_1$-$C_{12}$ linear or branched alkyloxy; $R_3$ is hydrogen or —$SO_3H$; $R_4$ is hydrogen or —$OCH_3$; and $R_5$ is hydrogen or hydroxyl)

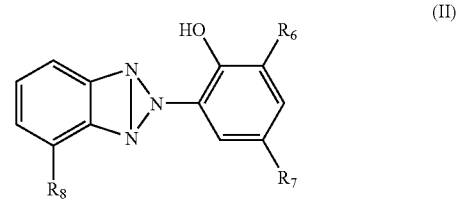

(II)

(wherein $R_6$ is hydrogen or $C_1$-$C_5$ linear or branched alkyl; $R_7$ is $C_1$-$C_5$ linear or branched alkyl; and $R_8$ is hydrogen or chlorine).

Preferred examples of the compounds represented by Formula (I) include 2,4-hydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone and 2-hydroxy-4-methoxy-5-sulfobenzophenone.

Preferred examples of the compounds represented by Formula (II) include 2-(2'-hydroxy-5'-tert-methylphenyl) benzotriazole, 2-(2'-hydroxy-5'-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole and 2-(2'-hydroxy-3',5'-tert-amylphenyl) benzotriazole.

In the present invention, the above-mentioned compounds represented by the above-described Formulae (I) and (II) may be used individually or in combination as teh ultraviolet absorber.

In the present invention, among these ultraviolet absorbers, 2-(2'-hydroxy-3'-tert-butyl-5'-methylphenyl)-5-chlorobenzotriazole is especially preferred in view of giving excellent light-resistance to the PPS member.

The ultraviolet absorber is dispersed and contained in the PPS member in an amount of preferably 0.1 to 6 parts by weight, more preferably 0.5 to 4 parts by weight based on 100 parts by weight of the PPS member. If the content of the ultraviolet absorber is less than 0.1 part by weight, the obtained PPS member may not have a sufficient light-resistance. On the other hand, even if the content of ultraviolet absorber is more than 6 parts by weight, a higher light-resistance is not given to the PPS member, so that it is not preferred in view of economy. Further, the outer appearance of the product may be degraded by breed out or the like.

The ultraviolet absorbers represented by the above-described Formulae (I) and (II) are commercially available from, for example, Ciba Specialty Chemicals and so on.

Although the method for incorporating the ultraviolet absorber is not restricted, the following example may preferably be employed.

That is, a method in which the above-described ultraviolet absorber, and a dispersing agent as required, is(are) are mixed with a solvent such as water to obtain a processing liquid (chemical composition), and the PPS substrate is made to contact the processing liquid. The contact may be attained by an arbitrary method such as immersion, spraying or coating. In view of the excellent ease of handling, immersion is preferably used for the contact.

More concretely, for example, a method is preferred in which the PPS substrate is immersed in the processing liquid bath at a bath ratio of preferably 4 to 400 times, more preferably 8 to 40 times using a high pressure high temperature vessel (e.g., high pressure dyeing machine). Although the processing temperature is not restricted, it is preferred to adjust the processing bath temperature to not lower than 140° C., more preferably not lower than 140° C. and not higher than 150° C. to further improve the light-resistance of the PPS member.

By incorporating the covering agent described below in the above-described processing liquid, the processing temperature may be lowered. The time period for the above-described contact is preferably 15 minutes to 120 minutes.

The PPS substrate which was made to contact the processing liquid under the above-described conditions is then removed from the processing bath, and washed by an ordinary washing method such as washing with water.

In the present invention, it is very preferred to incorporate a dispersing agent in the above-described processing liquid. By co-employing the dispersing agent, the dispersion of the ultraviolet absorber in the processing liquid (solution) is improved, and the light-resistance of the PPS member is drastically improved.

Preferred examples of such a dispersing agent include sulfates of styrene oxide adducts of polyoxyalkylenes; aliphatic acid esters of ethylene oxide adducts of styrenated phenol; and aliphatic acid esters of polyoxyethylenealkylallyl ethers. The dispersing agent is not restricted to those described above, and other dispersing agent may also be employed as long as the dispersing agent can promote the dispersion of the ultraviolet absorber in water.

The content of the dispersing agent contained in the processing liquid may preferably be 0.1 to 2 parts by weight, more preferably 0.2 to 1 part by weight based on 100 parts by weight of the PPS content in the substrate. If the content of the dispersing agent is less than 0.1 part by weight, the effect of the dispersing agent cannot be recognized with respect to the improvement of the light-resistance. On the other hand, even if the content is more than 2 parts by weight, better results are not obtained with the PPS member obtained by using the processing liquid, and the productivity may be degraded.

In the production of the PPS member according to the present invention, it is especially preferred to employ the above-described ultraviolet absorber having a specific average particle size and the above-described dispersing agent. The average particle size of the ultraviolet absorber is preferably not more than 2 µm, more preferably 0.1 µm to 1 µm. If the average particle size of the ultraviolet absorber is within this range, the light-resistance of the obtained PPS member may be further promoted prominently.

The ultraviolet absorber may be used individually, but it may also be used together with various dyes. By this, both the light-resistance and the dyeing property may be promoted.

When incorporating the ultraviolet absorber, the form of the substrate in which the ultraviolet absorber is to be incorporated is not restricted. The ultraviolet absorber may be incorporated in the substrate in the form of resin plate or film of PPS, or spun yarn consisting of 100% PPS fibers or spun yarn produced by blending PPS fibers with other generally used fibers, or may be incorporated in the substrate in the form of a woven fabric such as plain weave fabric. Alternatively, the ultraviolet absorber may be incorporated into PPS staple or filament, and then the obtained PPS staple or filament may be made into spun yarn or filament consisting of 100% PPS, or may be made into a blended spun yarn or combined filament yarn with other generally used fibers. Examples of the generally used fibers include wool fibers, cotton fibers, polyethylene terephthalate fibers, polyacrylonitrile fibers, polyurethane fibers, polyvinyl chloride fibers, polypropylene fibers and nylon fibers.

The ultraviolet absorber may be incorporated in the PPS substrate filled with fibers or the like. Examples of the filler include fibrous fillers such as glass fibers, glass milled fibers, carbon fibers, calcium titanate whiskers, zinc oxide whiskers, aramide fibers, alumina fibers, silicon carbide fibers, ceramic fibers, asbestos fibers and metal fibers; silicates such as wollastonite, zeolite, sericite, kaolin, mica, clay, bentonite, asbestos and talc; metal compounds such as alumina, silicon oxide, magnesium oxide, zirconium oxide, titanium oxide and iron oxide; calcium carbonate; sulfates such as barium sulfate; hydroxides such as magnesium hydroxide, calcium hydroxide and aluminum hydroxide; and non-fibrous fillers such as glass beads, glass flakes, ceramic beads, boric nitride, silicon carbide, carbon black, metal powder and silica.

In the production of the PPS member according to the present invention, it is preferred to incorporate a covering agent in the processing liquid together with the above-described ultraviolet absorber. The covering agent makes the ultraviolet absorber and the dye described below diffuse into deeper portions of the PPS substrate when the PPS substrate is contacted with the processing liquid. As a result, the PPS member produced using this processing liquid has an improved light-resistance and excellent dyeing property.

As the covering agent, emulsions containing an emulsifier and least one compound selected from the group consisting of the compounds represented by Formula (III) below and the compounds represented by Formula (IV) below, are preferably used.

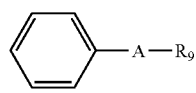

(III)

(wherein A is —O— or —C(O)O—; $R_9$ is phenyl or a derivative thereof, or substituted or non-substituted phenylalkylene)

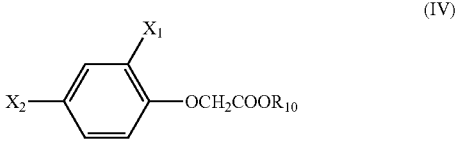

(IV)

(wherein $R_{10}$ is $C_1$-$C_5$ aliphatic hydrocarbon; and $X_1$ and $X_2$ independently represent hydrogen or halogen).

Preferred examples of the compounds represented by Formula (III) include phenyl benzoate and its derivatives (e.g., salicyl benzoate), benzyl benzoate and its derivatives, diphenyl ether, and phenyl benzyl ether and its derivatives.

Preferred examples of the compounds represented by the above-described Formula (IV) include the compounds represented by the following Formula (V) to (VII).

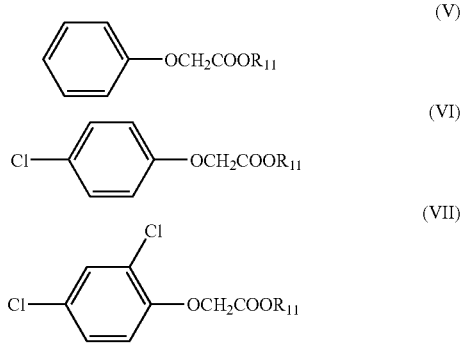

(V)

(VI)

(VII)

(wherein $R_{11}$ is $C_1$-$C_5$ aliphatic hydrocarbon).

More preferred examples of the compounds represented by Formula (IV) described above include the following compounds:

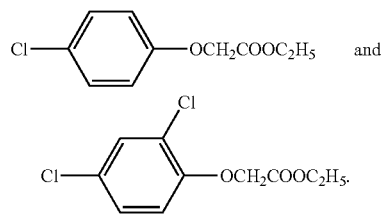

and

In the present invention, among the compounds represented by Formula (III) or (IV), benzyl benzoate is preferred in view of the general-purpose properties (e.g., the smell is small and ease of handling is excellent).

In case of using the covering agent in the present invention, the covering agent may be, for example, incorporated in the processing liquid. The covering agent is an emulsion containing the compound(s) represented by the above-described Formula (III) and/or (IV). Concretely, one containing the above-mentioned compound(s) and an emulsifier such as a surfactant is employed.

The covering agent used in the present invention contains the compound(s) represented by Formula (III) or (IV) in an amount of 10% to 40% by weight based on the total weight of the covering agent.

It is preferred to blend the covering agent to the processing liquid in an amount of preferably 1 to 20 parts by weight, more preferably 2 to 10 parts by weight with respect to 100 parts by weight of the PPS content in the substrate, which processing liquid further contains a dye. Making the content of the covering agent be within the range mentioned above is advantageous to economy and productivity. Further, by so doing, processing at a lower bath temperature may be carried out, so that deformation during the processing may be avoided, and deterioration or deformation of another material having poor thermal stability which is to be combined with the PPS substrate may be avoided. That is, both the light-resistance and dyeing property may be promoted without deteriorating the utility of the product.

The processing liquid containing the covering agent may be contacted with the PPS substrate at a lower temperature. The preferred temperature when using such a processing liquid is 100° C. to 130° C. If the processing temperature is lower than 100° C., sufficient light-resistance may not be given to the PPS member.

When the covering agent is contained in the processing liquid used in the present invention, the contact between the processing liquid and the polyphenylene sulfide substrate is carried out in the same manner as described above.

In the present invention, a disperse dye may be incorporated in the processing liquid, so as to promote the dyeing property of the polyphenylene sulfide substrate.

The disperse dye which may be employed is one generally used for dyeing of polyester fibers. Examples of such a disperse dye include Dyanix Yellow SE-G (produced by DyStar), Dyanix Yellow AM-42 (produced by DyStar), Dyanix Yellow Brown SE-R (produced by DyStar), Dyanix Red SE-CB (produced by DyStar), Dyanix Red S-2B (produced by DyStar), Dyanix Rubine SE-B (produced by DyStar), Dyanix Blue S-BG (produced by DyStar), Dyanix Navy SE-RN300% (produced by DyStar), Dyanix Black SE-RN300% (produced by DyStar), Dyanix Yellow AC-E (produced by DyStar), Dyanix Yellow AC-E01 (produced by DyStar), Dyanix Blue AC-E (produced by DyStar), Dyanix Blue E-R150% (produced by DyStar), Sumikaron Blue E-FBL (produced by Sumitomo Chemical Co., Ltd.), Sumikaron Navy Blue S-2GL (produced by Sumitomo Chemical Co., Ltd.) and Sumikaron Blue S-BG (produced by Sumitomo Chemical Co., Ltd). The disperse dye which may be used in the present invention is not restricted to those described above.

The content of the disperse dye contained in the processing liquid is preferably 0.001 to 40 parts by weight, more preferably 0.01 to 20 parts by weight with respect to 100 parts by weight of polyphenylene sulfide content in the substrate. If the content of the disperse dye is less than 0.001 part by weight, the polyphenylene sulfide substrate may not be dyed sufficiently. On the other hand, even if the content of the disperse dye is more than 40 parts by weight, the concentration of the dye on the polyphenylene sulfide member obtained by using the processing liquid is no longer increased, and it may be disadvantage to economy.

In the present invention, by using the ultraviolet absorber, and the processing liquid containing the disperse dye, the light-resistance and the dyeing property of the polyphenylene sulfide substrate are prominently promoted than those attained by using the conventional dyeing method. By adding the covering agent, and as required, a dispersing agent to the processing liquid, the light-resistance and the dyeing property of the polyphenylene sulfide substrate are prominently promoted than those attained by using the conventional dyeing method.

The PPS member processed by the processing liquid containing the above-mentioned covering agent preferably has an L value of not more than 80, more preferably not more than 70, still more preferably not more than 50. The "L value" herein is an index of lightness, which indicates the concentration of the color of an object, and may be measured by using a well-known colorimeter. In the present invention, L value was measured by Hunter's method using SM Color Computer (type: SM-4-2) produced by Suga Test Instruments Co., Ltd.

Detailed method for measurement is as follows:
1. In cases where the sample to be tested is a cloth, a test piece sizing not less than 10 cm×10 cm is sampled.
2. In cases where the sample is a thread, the thread is wound about a cardboard sizing not less than 10 cm×10 cm in the direction parallel to one side of the cardboard such that the thickness of the wound thread is uniform.
3. In cases where the sample is a staple, the staple is made into a sliver and the sliver is wound about a cardboard sizing not less than 10 cm×10 cm in the direction parallel to one side of the cardboard.
4. In cases where a sample is a resin plate, a test piece sizing not less than 10 cm×10 cm is sampled.
5. The obtained sample is mounted on a calorimeter and L value was measured by Hunter's method.

The present invention further provides a chemical composition for improving light-resistance of a polyphenylene sulfide member, comprising at least one ultraviolet absorber selected from the group consisting of the compounds represented by the above-described Formula (I) or (II). The composition preferably contains at least one covering agent selected from the group consisting of emulsions of the compounds represented by the above-described Formula (III) or (IV). The explanations about these compounds are described above.

The above-described PPS member may be in any form or structure. For example, molded articles made of PPS may be used as members of consumer electrical appliances, and may be used in the form of films. Further, after making PPS fibers into spun yarn, cloths such as fabrics and knits may be produced from the spun yarn, and the cloths may be made into socks, underwear, supporters, slacks, tights, stockings, Y-shirts, T-shirts, sweaters, trainers, sweats, suits, jumpers, jackets, coats, gloves, hats, mufflers and the like. Alternatively, PPS in the form of filaments may be made into fabrics, knits and the like, and socks, underwear, supporters, slacks, tights, stockings, Y-shirts, T-shirts, sweaters, trainers, sweats, suits, jumpers, jackets, coats, gloves, hats, mufflers and the like may be produced therefrom. Further, PPS in the form of cotton may be used as inner cotton of futon, coats, jumpers and jackets. Still further, PPS in the form of non-woven fabric may be used as blankets or the like.

EXAMPLES

The present invention will now be described concretely by way of examples thereof. The present invention is not restricted to the examples.

Example 1

Using PPS short fibers having a fineness of 2.0 d, cut length of 51 mm, and number of crimps of 14/inch (TORCON produced by Toray Industries, Inc.), spun yarn having an equivalent single yarn number of 20s and number of strands of 2 was obtained.

This spun yarn was subjected to plain weaving to obtain a plain weave fabric made of PPS spun yarn.

On the other hand, based on the weight of this fabric, 2 parts by weight of a dispersion of 2-(2'-hydroxy-3'-tert-butyl-5'-methylphenyl)-5-chlorobenzotriazole as an ultraviolet absorber (containing 30% by weight of this chlorobenzotriazole based on the total weight of the dispersion) (produced by Nagase Colors & Chemicals Co., Ltd., trademark "A-Light"), 1 part by weight of a dispersing agent (Sunsalt RM340 (produced by Nicca Chemical Co., Ltd., sulfate of styrene oxide adduct of polyoxyalkylenes and aliphatic acid ester adduct of styrenated phenol ethylene oxide), and 2000 parts by weight of water were mixed to prepare the processing liquid.

In a bath containing this processing liquid, the above-described plain weave fabric made of PPS spun yarn was immersed at 140° C. for 45 minutes, and then washed and dried in the air to obtain a processed plain weave fabric made of PPS spun yarn.

Example 2

Using the fabric made of PPS spun yarn produced as in Example 1, the same procedures as in Example 1 were repeated except that the amount of the dispersion of 2-(2'-hydroxy-3'-tert-butyl-5'-methylphenyl)-5-chlorobenzotriazole as an ultraviolet absorber was changed to 4 parts by weight, to obtain a processed plain weave fabric made of PPS spun yarn.

Example 3

The plain weave fabric made of PPS spun yarn as in Example 1 was used. A new processing liquid was prepared by adding 4 parts by weight (based on the weight of the fabric as in Example 1) of emulsion of benzyl benzoate as a covering agent to the same processing liquid as prepared in Example 1.

The same procedures as in Example 1 were repeated except that the plain weave fabric made of PPS spun yarn was immersed in this processing liquid at 120° C. for 45 minutes, to obtain a processed plain weave fabric made of PPS spun yarn.

Example 4

The plain weave fabric made of PPS spun yarn as in Example 1 was used. Based on the weight of this fabric, 2 parts by weight of a dispersion of 2-(2'-hydroxy-3'-tert-butyl-5'-methylphenyl)-5-chlorobenzotriazole as an ultraviolet absorber (containing 30% by weight of this chlorobenzotriazole based on the total weight of the dispersion), 1 part by weight of a dispersing agent (Sunsalt RM340 (produced by Nicca Chemical Co., Ltd., sulfate of styrene oxide adduct of polyoxyalkylenes and aliphatic acid ester adduct of styrenated phenol ethylene oxide), 4 parts by weight of benzyl benzoate emulsion as a covering agent, 3.3 parts by weight of a disperse dye (Dyanix Red AC-E (produced by DyStar) and 2000 parts by weight of water were mixed to prepare a processing liquid.

In a bath containing this processing liquid, the above-described plain weave fabric made of PPS spun yarn was immersed at 120° C. for 45 minutes, and then washed and dried in the air to obtain a processed plain weave fabric made of PPS spun yarn.

Comparative Example 1

The plain weave fabric made of PPS spun yarn used in Example 1 before the processing was evaluated.

The above-described 5 types of plain weave fabrics were evaluated for their light-fastness ratings against light from an ultraviolet carbon arc lamp, which ratings were measured in accordance with JIS L-0842 by using a closed type ultraviolet auto fade meter (type FAL-AU-B) produced by Suga Test Instruments Co., Ltd.

Detailed method for evaluation was as follows:
1. The plain weave fabrics obtained in Examples 1-4 and Comparative Example 1 were cut into pieces sizing 1 cm×6 cm to obtain test pieces.
2. The blue scale from Class 1 to Class 4 defined in JIS L-0842 "Method for testing fastness of dyeing to sunlight" was provided.
3. Half part of each of the test pieces and half part of the blue scale were covered with opaque white cardboards, respectively, and the test piece and the blue scale were mounted on a sample holder for a closed type ultraviolet auto fade meter (type FAL-AU·B) produced by Suga Test Instruments Co., Ltd. defined in JIS L-0842.
4. The sample holder on which the test piece and the blue scale were mounted was set in the testing apparatus.
5. Exposure to light was started and continued until the color of the class of interest in the blue scale was faded to the standard level.
6. When the color of the class of interest in the blue scale was faded, exposure was stopped, and the test piece and the blue scale were taken out, followed by leaving the test piece and the blue scale to stand in a dark place at room temperature for not less than 2 hours.
7. The color change between the irradiated part and non-irradiated part of the test piece, and color change between the irradiated part and non-irradiated part of the blue scale are compared, and the degree of change or fading of color is rated according to the following rating criteria.

TABLE 2

| Judging Criteria | Class |
| --- | --- |
| The degree of change or fading of the color of the test piece is the same as that of the blue scale | The class of the blue scale |
| The degree of change or fading of the color of the test piece is the same as that of the blue scale or smaller than that | The class of the blue scale or higher |
| The degree of change or fading of the color of the test piece is larger than that of the blue scale | Less than the class of the blue scale |

The results are shown in Table 3.

TABLE 3

| | Example 1 | Example 2 | Example 3 | Example 4 | Comparative Example 1 |
| --- | --- | --- | --- | --- | --- |
| Light-Fastness Rating Class 1 Irradiation | not less than 1 | not less than 1 | not less than 1 | not less than 1 | less than 1 |
| Class 2 Irradiation | not less than 2 | not less than 2 | not less than 2 | not less than 2 | less than 2 |
| Class 3 Irradiation | not less than 3 | not less than 3 | 3 | not less than 3 | less than 3 |
| Class 4 Irradiation | 4 | not less than 4 | less than 4 | not less than 4 | less than 4 |

As seen from these results, the light-fastness ratings of the plain weave fabrics made of PPS spun yarn according to Examples 1 to 4 were better than that of Comparative Example 1, and the degree of color change by ultraviolet light was very small.

Example 5

A fabric made of polyphenylene sulfide fibers (trademark: TORCON, 200 deniers; multifilament comprising 50 filaments; produced by Toray Industries, Inc.) was cut into a piece sizing 9 cm×20 cm to obtain a test piece. On the other hand, based on the weight of this fabric, 2 parts by weight of a dispersion of 2-(2'-hydroxy-3'-tert-butyl-5'-methylphenyl)-5-chlorobenzotriazole as an ultraviolet absorber (containing 30% by weight of this chlorobenzotriazole based on the total weight of the dispersion), 1 part by weight of a dispersing agent (Sunsalt RM340 (produced by Nicca Chemical Co., Ltd., sulfate of styrene oxide adduct of polyoxyalkylenes and aliphatic acid ester of ethylene oxide adduct of styrenated phenol ethylene oxide adduct), and 2000 parts by weight of water were mixed to prepare the processing liquid.

In a bath containing this processing liquid, the above-described plain weave fabric made of PPS spun yarn was immersed at 140° C. for 45 minutes, and then washed and dried in the air to obtain a processed plain weave fabric made of PPS spun yarn.

This fabric piece was subjected to the test by the "test method for light-fastness rating against light from an ultraviolet carbon arc lamp" defined in JIS L-0842 employing the exposure method according to "6.(2) Second Exposure Method" defined in JIS L-0841. Further, by "9. Judgment of Fastness of Dyeing" defined in JIS L-0801, the degrees of color change and fading of the processed test piece and of the blue scale were visually compared. The rating of the processed test piece was judged as Class 4.

Comparative Example 2

The same procedures as in Example 5 were repeated except that the non-processed test piece which was not immersed in the processing liquid was subjected to the test for the fastness of dyeing as it is, thereby carrying out the judgment of the fastness of dyeing of the test piece. The obtained result of the judgment was less than Class 1.

Example 6

The same procedures as in Example 5 were repeated except that 4 parts by weight (based on the weight of the fabric as in Example 5) of emulsion of benzyl benzoate was added to the processing liquid to prepare a new processing liquid, and that the test piece was immersed in the processing liquid at 120° C. for 45 minutes, thereby preparing a processed test piece and evaluating the test piece. The obtained result of the judgment was Class 3.

Comparative Example 3

The same procedures as in Example 6 were repeated except that non-processed test piece which was not immersed in the processing liquid was subjected to the test for fastness of dyeing as it is, thereby carrying out the judgment of the fastness of dyeing of the test piece. The obtained result of the judgment was less than Class 1.

Example 7

A fabric made of polyphenylene sulfide fibers (trademark: TORCON, 200 deniers; multifilament comprising 50 filaments; produced by Toray Industries, Inc.) was cut into pieces each sizing 9 cm×20 cm to obtain two test pieces. On the other hand, based on the weight of this fabric, 2 parts by weight of a dispersion of 2-(2'-hydroxy-3'-tert-butyl-5'-methylphenyl)-5-chlorobenzotriazole as an ultraviolet absorber (containing 30% by weight of this chlorobenzotriazole based on the total weight of the dispersion), 1 part by weight of a dispersing agent (Sunsalt RM340 (produced by Nicca Chemical Co., Ltd., sulfate of styrene oxide adduct of polyoxyalkylenes and aliphatic acid ester of ethylene oxide adduct of styrenated phenol ethylene oxide adduct), 4 parts by weight of benzyl benzoate emulsion, 3.3 parts by weight of a disperse dye (Dyanix Red AC-E (produced by DyStar) and 2000 parts by weight of water were mixed to prepare the processing liquid.

In a bath containing this processing liquid, the above-described test pieces weave immersed at 120° C. for 45 minutes, and then washed and dried in the air to obtain processed test pieces.

One of the thus obtained test pieces was subjected to the same test and evaluation as in Example 5. The obtained result of the judgment was not less than Class 4.

To measure the concentration of the dye, the other processed test piece was subjected to measurement of the total K/S value in the range of 400 nm to 700 nm using Color Eye 7000 colorimeter (produced by Macbeth). The obtained total K/S value was 28.97.

Comparative Example 4

A processing liquid was prepared by mixing 3.3 parts by weight of a disperse dye (Dyanix Red AC-E (produced by DyStar), 1 part by weight of a dispersing agent (Sunsalt RM340 (produced by Nicca Chemical Co., Ltd., sulfate of styrene oxide adduct of polyoxyalkylenes and aliphatic acid ester adduct of styrenated phenol ethylene oxide) and 2000 parts by weight of water. Two test pieces were immersed therein at 120° C. for 45 minutes, and then washed and dried in the air to obtain processed test pieces. The test piece was subjected to the evaluation of the fastness of dyeing as in Example 7. The obtained result of the judgment was less than Class 1. The total K/S value of the processed test piece was 6.88.

Example 8

The processed liquid was prepared and the two test pieces were treated in the same manner as in Example 7 except that 1.5 parts by weight of Dyanix Blue AC-E (produced by DyStar) was used in place of Dyanix Red AC-E (produced by DyStar).

The judgment of the fastness of dyeing of the obtained processed test piece was Class 3. The total K/S value of the processed test piece was 27.29.

Comparative Example 5

The processed liquid was prepared and the two test pieces were treated in the same manner as in Comparative Example 4 except that 1.5 parts by weight of Dyanix Blue AC-E (produced by DyStar) was used in place of Dyanix Red AC-E (produced by DyStar). The obtained result of judgment was less than Class 1. The total K/S value of the processed test piece was 8.02.

Example 9

The processed liquid was prepared and the two test pieces were treated in the same manner as in Example 7 except that 2.1 parts by weight of Dyanix Yellow AC-E (produced by DyStar) was used in place of Dyanix Red AC-E (produced by DyStar).

The judgment of the fastness of dyeing of the obtained processed test piece was Class 4. The total K/S value of the processed test piece was 23.48.

Comparative Example 6

The judgment of fastness of dyeing of the test piece was carried out in the same manner as in Comparative Example 4 except that 2.1 parts by weight of Dyanix Yellow AC-E (produced by DyStar) was used in place of Dyanix Red AC-E (produced by DyStar). The obtained result of judgment was less than Class 1. The total K/S value of the processed test piece was 6.26.

Example 10

The judgment of fastness of dyeing of the test piece was carried out in the same manner as in Example 5 except that a plate (5 cm×8 cm: thickness 1.2 mm) made of polyphenylene sulfide was used as the test piece in place of the fabric made of polyphenylene sulfide fibers. The obtained result of judgment was Class 3.

Comparative Example 7

The judgment of fastness of dyeing of the test piece was carried out in the same manner as in Example 10 except that the non-processed test piece which was not immersed in the processing liquid was subjected to the test for fastness of dyeing as it is. The obtained result of judgment was less than Class 1.

INDUSTRIAL AVAILABILITY

The PPS member according to the present invention may be used in various fields as fibers, molded articles and the like of which light-resistances were improved.

The invention claimed is:

1. A method for producing a polyphenylene sulfide fiber containing a disperse dye and at least one ultraviolet absorber diffused into said polyphenylene sulfide fiber from the surface thereof, the polyphenylene sulfide fiber having a light-fastness rating of Class 1 or higher against light from an ultraviolet carbon arc lamp, which rating is measured in accordance with JIS L-0842, the method comprising the step of contacting a polyphenylene sulfide fiber with a processing liquid containing (a) said at least one ultraviolet absorber at a temperature between 100° C. and 130° C., said at least one ultraviolet absorber being selected from the group consisting of 2,4-hydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone and a compound represented by Formula (II) below:

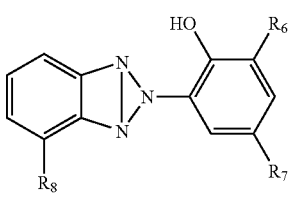

(II)

wherein $R_6$ is hydrogen or $C_1$-$C_5$ linear or branched alkyl; $R_7$ is $C_1$-$C_5$ linear or branched alkyl; and $R_8$ is hydrogen or chlorine; said processing liquid further comprising an agent for enhancing diffusion of the ultraviolet absorber into the polyphenylene sulfide member and containing at least one compound selected from the group consisting of a compound represented by Formula (III) below and a compound represented by Formula (IV) below, an emulsifier, (b) said disperse dye, and (c) a dispersing agent:

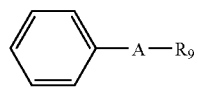

(III)

wherein A is —O— or —C(O)O—; $R_9$ is phenyl or a derivative thereof, or substituted or non-substituted phenylalkylene;

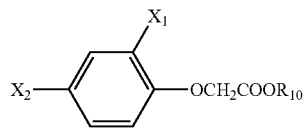

(IV)

wherein $R_{10}$ is $C_1$-$C_5$ aliphatic hydrocarbon; and $X_1$ and $X_2$ independently represent hydrogen or halogen.

2. The method according to claim 1, wherein said ultraviolet absorber is 2-(2'-hydroxy-3'-tert-butyl-5'-methylphenyl)-5-chlorobenzotriazole.

3. The method according to claim 1, wherein said agent for enhancing diffusion of the ultraviolet absorber into the polyphenylene sulfide member comprises at least one compound selected from the group consisting of phenyl benzoate and its derivatives, benzyl benzoate and its derivatives, diphenyl ether, phenylbenzyl ether and its derivatives, and compounds represented by Formulae (V) to (VII):

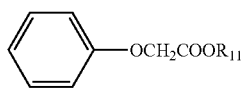

(V)

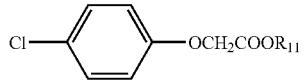

(VI)

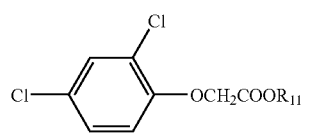

(VII)

wherein $R_{11}$ is $C_1$-$C_5$ aliphatic hydrocarbon.

* * * * *